United States Patent [19]

Yan

[11] Patent Number: 4,642,196
[45] Date of Patent: Feb. 10, 1987

[54] METHOD FOR CONTROLLING DUST AND SPONTANEOUS COMBUSTION IN THE DRYING, HANDLING, TRANSPORTING AND STORING OF COAL

[75] Inventor: Tsoung Y. Yan, Philadelphia, Pa.

[73] Assignee: Mobil Oil Corporation, New York, N.Y.

[21] Appl. No.: 761,446

[22] Filed: Aug. 1, 1985

Related U.S. Application Data

[63] Continuation-in-part of Ser. No. 594,581, Mar. 29, 1984, abandoned.

[51] Int. Cl.$^4$ .............................................. C09K 3/12
[52] U.S. Cl. ........................................ 252/88; 404/76
[58] Field of Search ............................ 252/88; 404/76

[56] References Cited

U.S. PATENT DOCUMENTS

| | | | |
|---|---|---|---|
| 2,319,942 | 5/1943 | Miller | 44/6 |
| 2,436,146 | 2/1948 | Kleinicke | 252/88 |
| 2,448,605 | 9/1948 | Kleinicke | 136/123 |
| 2,786,815 | 3/1957 | Buggisch et al. | 252/88 |
| 3,533,953 | 10/1970 | Mills et al. | 252/88 |
| 3,900,611 | 8/1975 | Corbett et al. | 427/214 |
| 4,038,443 | 7/1977 | Jacoby | 427/136 |
| 4,055,471 | 10/1977 | Beck et al. | 201/20 |
| 4,067,818 | 1/1978 | Marin | 252/88 |
| 4,136,050 | 1/1979 | Brehm | 252/88 |
| 4,269,721 | 5/1981 | Mueller et al. | 252/88 |
| 4,316,811 | 2/1982 | Burns et al. | 252/88 |
| 4,369,121 | 1/1983 | Callahan et al. | 252/88 |
| 4,417,992 | 11/1983 | Bhattacharyya et al. | 252/88 |

FOREIGN PATENT DOCUMENTS 2305482 11/1976 France .
11409 of 1908 United Kingdom .
601878 5/1948 United Kingdom .

OTHER PUBLICATIONS

Luckie et al., "The Very Special Considerations Involved in Thermal Drying of Western Region Coals," Coal Age Operating Handbook of Coal Preparation (1978).

Wegert et al., "Enriching Western Coals by Thermal Drying and Oil Treatment," Coal Age Operating Handbook of Preparation (1978).

Primary Examiner—A. Lionel Clingman
Assistant Examiner—Hoa Van Le
Attorney, Agent, or Firm—Alexander J. McKillop; Michael G. Gilman; Charles J. Speciale

[57] ABSTRACT

A method and composition for controlling dust occurring in the production, handling, transport and storing of coal which includes applying such as by spraying an aqueous solution of a gelatinized starch. The solution, which contains from about 5 to about 50% by weight of gelatinized starch, is sprayed at selected locations to prevent and/or inhibit the formation of dust. The invention also includes the use of naturally-occurring dust control derivatives such as tall oil and rosin.

12 Claims, No Drawings

METHOD FOR CONTROLLING DUST AND SPONTANEOUS COMBUSTION IN THE DRYING, HANDLING, TRANSPORTING AND STORING OF COAL

This application is a continuation-in-part of U.S. Ser. No. 06/594,581 filed on 03/29/84, now abandoned.

BACKGROUND OF THE INVENTION

The present invention relates to the art of coal production, and, in particular, to the art of controlling dust and spontaneous combustion resulting from production, drying, handling, and transportation of coal.

Dust, which is produced in large quantities as a result of handling, transporting and storage of coal, is a constant source of annoyance and danger, as it is the cause of coal dust explosions and because it presents a hazard to the respiratory system. Coal dusting is also the cause of significant coal loss during transportation.

This dust is a result of degradation caused partly by the escape of moisture from the coal and partly by the oxidation of mineral matter, particularly iron sulfide, contained in cleavage veins of coals and similar fuels. Another cause for dust production, which occurs in both high rank and low rank coals, is a high degree of mechanical abrasion which necessarily results during handling and transportation.

Accordingly, since coal remains an important chemical and energy source, concentrated efforts to control dust must be made in order to insure its commercial availability.

For example, in the case of low rank coals, subbituminous, lignite and peat, the moisture content is between about 20 to 50 wt % or higher, resulting in low heat content. Much of the low heat content coal mines in the United States are generally located in areas with low demand for coal, for instance, Wyoming and North Dakota, and this coal is expensive to transport so that the marketing is severely restricted. Moreover, high moisture coal can freeze in the winter and make handling and transportation difficult. In addition, use of low heat content coal in an industrial furnace often requires derating of the existing units and increasing design capacity for the new units. Thus, the incentives for drying such low rank coal are obvious. Many companies, both coal producers and drying equipment manufacturers are developing techniques for drying low rank coals.

In comparison with Eastern high rank coals, the Western low rank coal is more difficult to dry. The desirable moisture level of the dried product is generally accepted to be about 8–12 wt % which is lower than the surface moisture level. Surface moisture, defined as the water held loosely by coal which can be removed easily by physical means such as draining and centrifuging, etc., is about 3–10 percent by weight. As a result, the Western coal has to be dried at more severe conditions and higher temperatures. Under such conditions, coal particles tend to shrink, crumble and disintegrate to form excess amounts of fines and dust. Excessive amounts of fines and dust degrade the product and make the product difficult to handle and transport, and most importantly, cause safety and fire hazards.

Dried low rank coal tends to combust spontaneously during transportation and storage. The dusting problem is particularly serious when a fluidized bed dryer is used, and, in recent years, the new dryers are almost entirely fluidized bed types which are schematically shown and discussed in Coal Age 109, January 1976, and Coal Mining & Processing, 39 October 1969.

Thus, in order to understand more about coal dust formation, studies have been conducted of the fragmentation pattern of subbituminous and bituminous coal as a function of feed particle size.

It has been generally known in the art of allaying dusting in coal to use oils or aqueous mixtures of deliquescent chemicals such as calcium chloride, magnesium chloride, and potassium carbonate. See generally U.S. Pat. Nos. 2,319,942; 2,448,605; 2,786,815; 3,533,953; 4,038,443 (which also shows the use of clay in aqueous solution); and U.S. Pat. No. 4,067,818. However, with the continuing rise in petroleum prices, the use of petroleum based dust control agents is becoming or has become economically unattractive for large scale use. In U.S. Pat. No. 4,269,721, the use of a calcium sulfate-containing composition, which is produced from the fluid bed combustion of coal, is disclosed as a means for preventing dusting. All of the agents listed above are believed to be rather expensive and/or tedious in use and/or introduce pollutants to the atmosphere during burning and thermal operations performed on coke or coal.

More recently, efforts to control dust have resulted in the use of an aqueous solution containing cellulose ether along with a wetting agent applied to stockpiles of aggregate materials at a rate of from about 0.05 to about 0.20 gallons per square foot of surface area. See U.S. Pat. No. 4,369,121. Further attempts to effect dust control have led to development of a liquid dispersion of watery consistency of highly branched water swellable polymer of acrylamide or an acrylamide-acrylic acid copolymer, branched and/or crosslinked with a multifunctional unsaturated monomer containing more than one ethylenically unsaturated group. The crosslinked polymer or copolymer has a three-dimensional structure and is in the form of microgelatinous particles having a particle size not exceeding approximately one micron in an oil containing emulsion form and having the property of swelling dramatically in water and binding dust particles upon adsorption from solution. See U.S. Pat. No. 4,417,992. See also U.S. Pat. No. 4,316,817 and U.S. Pat. No. 4,136,050. These methods, however, involve a rather elaborate approach and somewhat careful preparation and are not believed to provide a simple inexpensive method of controlling dust.

U.S. Pat. No. 4,055,471 to Beck et al. discloses the use of an aqueous solution of 30–70% by weight of waste sulfite liquor as a means for inhibiting dust formation while feeding coal into a coking chamber. Alternative binders considered suitable for controlling coal dust include starches, dextrin, molasses, casein and glue. Surfactants used by Beck et al. to aid in the wetting of the hot coal include sodium soap, potassium soap, sulfate of fat alcohols and fat alcoholpolyoxyethylene products. There is no indication or suggestion by Beck et al., however, with regard to providing a dust inhibiting composition for controlling coal dust during transportation.

It is, therefore, an object of the present invention to provide a simple, inexpensive means of preventing and/or reducing the incidence of dust by use of naturally occurring derivative products, especially in relationship to the production and handling of low rank coal.

BRIEF DESCRIPTION OF THE INVENTION

The present invention is a method and composition for controlling dust formation during the production, drying, handling, transporting, and storage of coal, especially low rank coals such as Western low rank coals, which includes primarily applying a dust inhibiting amount of an aqueous solution of a naturally occurring derivative product. One such product is gelatinized starch, a naturally occurring polysaccharide which can be derived from a source such as potato, tapioca, corn, waxy corn, wheat, sorghum, rice, barley, cassava, and combinations thereof; and preferably, the source is one of corn, barley, and rice because of the nature of the starch included therein. The term starch, as used herein, includes partially processed starch with its cellulosic derivative, so long as it provides the agglomerating properties required to allay the dust.

The aqueous solution of gelatinized starch can be prepared by heating an aqueous starch solution to a temperature of from about 60° to about 200° C. whereby an irreversible swelling occurs which results in gelatinization. Alternatively, the starch solution can be prepared by dry heat treating starch at a temperature of from about 120° to about 200° C. to form pyrodextrins which are then dissolved in cold water. If an acid catalyst is used, such as HCl or $HNO_3$, the heat treatment can be reduced to a range of from about 90° to about 130° C. before dissolving the resulting pyrodextrins in water. As a result of using gelatinized starch, a simple single-component aqueous system can be used to effectively reduce dust in low-rank coals, e.g., in the absence of added salt.

Application of the aqueous solution of gelatinized starch is effected by spraying the primarily aqueous medium containing from 5 to 50% by weight of starch while at a temperature of from about 60° to about 200° C. at pressures up to about 500 psi. The use of this temperature range permits gelatinization without an undesirable depolymerization effect which can occur at elevated temperatures. Furthermore, since it is beneficial to apply the gelatinized starch solution at as thick a consistency as possible, a high pressure application system is very important.

The atomizing or spray device is ideally located at dust control locations such as at the top of a fluidization bed dryer used to dry the low rank coal, at exits of cyclones used in conjunction with the dryer, or on top of coal cars used to transport the coal, and on top of stockpiles of the low rank coal. The solution can also be applied to the coal by spraying on a mixer such as a screw conveyor or pug-mill.

The starch solution should be applied at a dosage rate of from about 0.05 to about 10% of starch based on the weight of the coal, and preferably, the dosage rate is from about 0.1 to about 2% of starch to coal. Thus, while the dosage required depends on the size and fraction of the coal fines, i.e., the smaller the size and the greater quantity of small size fines—the higher the dosage of agglomerating composition, the above percentages represent a surprisingly low amount of agglomerizing agent for effecting the desired results.

Other natural dust-preventing extracts can be obtained from plants having agglomerating extracts such as the extract from a jute leaf or seaweed. Another preferred embodiment includes by-products of wood pulp digestion, e.g., tall oil, rosin, etc. in a concentration of from about 0.1 to about 5% by weight based on the coal, and preferably from about 1.0 to about 3.0%. Tall oil is an inexpensive by-product of the paper industry obtained by treating raw effluent, e.g., sulfite liquor, to yield the organic component, and rosin results from acid treatment of tall oil. Both can be employed as a powder which can be mechanically spread over the coal or sprayed as an aqueous solution.

As a result of the present method and composition, it is now possible to provide a simple, inexpensive means of controlling dust in the production and handling of coal, especially Western low rank coals so that it is economically feasible to use such coal without fear of spontaneous combustion caused by the formation and dispersion of coal fines and dust. Furthermore, the treated coal can be combusted without fear of the combustion products, such as those resulting from burning salt, etc.

For a better understanding of the present invention, together with other and further objects, reference is made to the following description, and its scope will be pointed out in the appended claims.

DETAILED DESCRIPTION OF THE INVENTION

By the present invention there is provided, among other things, improvement in the production and handling of coal, especially the upgrading of Western low rank coal. For example, run-of-mine low rank coal, including lignite, peat, subbituminous coals such as those mined in Wyoming and North Dakota which contain 20–50% or higher water as it comes from the mine, is pulverized to above 2 mesh X O, and preferably 4 mesh X O. At this point, the low rank coal may optionally be mixed with a volatile high caking bituminous coal or other coal or other thermoplastic binder material to reduce ultimate coal dust and fine formation, as is disclosed in related application Ser. No. 523,220, filed Aug. 15, 1983, now abandoned, which has the same assignee.

The resulting pulverized coal is then subjected to drying. The drying temperatures depend somewhat on the type of dryer and nature of the coal. For instance, the coal drying temperature associated with the undergrate zone in a fluidized bed is 600°–1200° F., and preferably from about 800°–1000° F., while the overgrate temperature range is 150°–400° F., and preferably 200°–300° F. The average fluidized bed temperature is closer to the overgrate temperature than the undergrate temperature.

In order to bind coal fines and coal particles, an inexpensive aqueous solution of a binding and agglomerating agent is needed. Starch, a naturally occurring polysaccharide, has been found to be ideal in the role of a dust inhibiting agent. Most common starches contain about 20% of water-soluble fraction called amylose, and a water-insoluble fraction called amylopectin, both of which are made up of D-(+)-glucose units and correspond to different carbohydrates of high molecular weight and formula $(C_6H_{10}O_5)_n$.

Use of starch is environmentally desirable since it does not produce an undesirable odor upon burning, nor does it emit an undesirable product when combusted in combination with coal, as would normally occur when salt is burned with coal.

The starch can be gelatinized by heating a starch water solution above the gelatinization temperature of the particular starch. Above this temperature, a large irreversible swelling occurs producing gelatinization.

Gelatinization takes place over a discrete temperature range that depends on starch type. Some gelatinization temperature ranges are as follows:

| Starch | Temperature Range, °C. |
|---|---|
| Potato | 59–68 |
| Tapioca | 58.5–70 |
| Corn | 62–72 |
| Waxy Corn | 63–72 |
| Wheat | 58–74 |

Excessively high temperatures cause extensive depolymerization of starch and loss of effectiveness for the instant application. As a result, the preferred range of heating is 60° to 200° C. To facilitate the application of the solution to the coal by spraying the solution temperature in the range of 60° to 150° C. is preferred, but temperatures of up to about 200° C. can be used. The concentration of starch should be as high as possible without causing difficulty in operation due to high viscosity. Generally a concentration range of 5 to 50% can be employed. Furthermore, it is preferred to use a high pressure system in order to spray as highly viscous a system as possible.

As a result of gelatinization, agglomeration is conveniently effected even with very fine particulate matter without need of a surfactant.

All types of starch including corn, wheat, sorghum, rice, barley, potato, tapioca and cassava are suitable for this application. Even though, as indicated before, most common starches contain the two different types of D-glucopyranose polymers, i.e., amylose and amylopectin, the starches rich in amylopectin are more effective in this application. Such starches include corn, barley and rice.

An alternative method of preparing the starch solution is by dry heat treating at 120° to 200° C. to form pyrodextrins which are then dissolved in cold water. Pyrodextrins are brown, tasteless heat-decomposition products of starch, involving the linkage of linear chains from amylose with branched chains from amylopectin. If an acid catalyst such as HCl or $HNO_3$ is used, the heat treatment temperature can be lowered to 90°–130° C.

While any convenient means of dispersing the dust controlling agent can be used, the solution containing gelatinized starch is preferably applied to the coal fines by use of an atomizing device or spray. This atomization is facilitated by increasing pressure of the solution up to 500 psi and increasing the temperature up to 200° C.

The spray of starch solution can be applied at locations needed for dust control, e.g., during mixing in a screw conveyor or a pug mill, at the top of the fluidized bed dryer before the cyclone, at the exits of the cyclone, at the points of coal transfer, on the top of the coal car and the top of stock piles. The dosage of application is between 0.05 to 10% of starch based on the coal, and the preferred range is 0.1% to 2%.

EXAMPLE 1

In order to determine the efficacy of the starch embodiment of the present invention, tests were conducted comparing dust allaying characteristics of starch with that of petroleum resids when used on coal fines resulting from subbituminous coal.

Coal fines having a mesh size of 200+ were dried in a glass tube in an oven at 300°–400° C. for four hours. Nitrogen was passed through the reactor at 200 ml/min to remove the moisture. In certain samples, dust control agents were used to determine the respective agglomerating capabilities.

Specifically, aqueous solutions of gelatinized starch were sprayed on the coal before drying, as also were petroleum resids in a toluene solution. The dried coal was then analyzed for size distribution.

The results are reported below in Table 1.

TABLE 1

| Agent | Dosage, Wt. % | Mesh Size Distribution Wt. % | | | | |
|---|---|---|---|---|---|---|
| | | 80+ | 80–100 | 100–150 | 150–200 | 200+ |
| None | 0 | 0.8 | 3.0 | 1.3 | 6.3 | 88.6 |
| Starch | 1% | 0.8 | 5.0 | 4.8 | 13.2 | 76.2 |
| " | 3% | 8.9 | 14.1 | 9.4 | 16.5 | 51.1 |
| Petroleum Resids | 1% | 0.6 | 0.7 | 1.0 | 1.5 | 96.2 |
| Petroleum Resids | 3% | 0.6 | 0.9 | 1.7 | 16.3 | 80.3 |

The coal fines used were from subbituminous coal from Gilette, Wyo., and were nominally sized as 200+mesh.

This severe test of agglomerating capabilities of the different solutions clearly indicate that the starch solutions are significantly more effective than the petroleum resids in preventing and/or controlling the existence of dust, i.e., the incidence of dust, 200+, was at least 20% greater in the petroleum resids samples than in the starch samples.

At the dosage of 3%, the 200+ mesh fines were reduced from 88.6% to 51.1% by use of the gelatinized starch solution, whereas the petroleum resids reduced the 200+ mesh fines to about 80.3%, thereby demonstrating that in the environment of this experiment, the starch solution was about four times as effective as the petroleum resids in agglomerating coal fines.

OTHER EMBODIMENTS

There are other known naturally occurring derivatives, including treated effluent resulting from wood pulp or cellulose digestion, e.g., tall oil and rosin, the product resulting from acid neutralization of a basic tall oil solution. To this end, further experiments were conducted using coal of known size distribution also dried in a glass tube in an oven at 300°–400° C. for four hours. Once again, nitrogen was passed through the reactor at 200 ml/min. to remove the moisture.

In order to determine the effectiveness of the natural derivatives indicated above, rosin powder having a size of 100+ mesh was mixed directly with the coal in certain samples. Tall oil, was dispersed in the coal as a solution. Both of these binders were compared to resid petroleum added to the coal in a solution of toluene which was then removed by use of a rotovaporizer.

Basically, the coal particle size selected for these experiments was from 80–200 mesh which is a representation of the fine fraction of coal that is dried in industrial operations. It was selected because the finer coal is the most likely dust precursor.

Results of these experiments are shown in Table II.

TABLE II

| Coal Feed | Drying Conditions | | | Mesh Size Distribution, Wt. % | | | | |
|---|---|---|---|---|---|---|---|---|
| | Binder | Wt. % | Temp. °C. | 80 | 80-100 | 100-150 | 150-200 | 200 |
| Subbituminous 80-100 mesh | None | — | 402 | 4.4 | 17.5 | 71.9 | 5.7 | 0.5 |
| Subbituminous 100-150 mesh | None | — | 402 | — | 0.3 | 43.9 | 53.1 | 2.7 |
| Subbituminous 150-200 mesh | None | — | 317 | 2.8 | 1.0 | 2.3 | 60.2 | 33.7 |
| Subbituminous 100-150 mesh | Tall Oil | 5% | 315 | — | 0.4 | 80 | 19 | 0.2 |
| Subbituminous 100-150 mesh | Rosin | 5% | 315 | 0.2 | 0.3 | 72.8 | 26.1 | 0.6 |
| Subbituminous 100-150 mesh | Resid | 5% | 320 | 0.6 | 3.4 | 73 | 20.6 | 2.4 |
| Bituminous 150-200 | None | — | 406 | 17.8 | 12.6 | 3.9 | 41 | 25.7 |
| Bituminous 100-150 | None | — | 406 | — | 0.3 | 43.9 | 53.1 | 2.7 |

As can be seen the results of the test, upon drying the coal feed disintegrated into smaller sizes. Generally, it is interesting to note that the coal disintegrated mainly to its next smaller size. For example, the dried product of an 80-100 mesh subbituminous coal is 71.9% of 100-150 mesh, and only 5.7% and 0.5% of 150-200 and 200+ mesh coals, respectively. This suggests that the coal breaks up into two or more pieces of similar sized fragments. The same trend was observed in coal of four other starting sizes, bituminous or subbituminous.

Accordingly, dust (defined as 200+mesh) can be expected to be derived mainly from 150-200 mesh size wet coal. The drying of 150-200 mesh subbituminous coal produce 33.7% dust, while 2.7 and 0.5% dust are produced in the drying of 100-150 and 80-100 mesh coal, respectively.

The drying of bituminous coal resulted in fragmentation to produce dust and at the same time cake to form coal aggregates larger than that of the feed. The caking effect is more pronounced in drying 150-200 mesh bituminous coal than in the 100-150 mesh bituminous coal.

Tall oil and rosin, both inexpensive by-products of the paper industry, were effective in controlling dust. Specifically, drying of 100-150 mesh subbituminous coal containing 5% rosin produced only 0.6% dust and retained 73% of its original size.

In the case of 5% tall oil in the same coal, 0.2% coal dust formation and 80% retention of size were achieved. Without rosin or tall oil, the same coal yielded 2.7% dust and only 44% size retention. Thus, tall oil and rosin have been shown to eliminate 93% and 78% dust in the drying of 100-150 mesh size subbituminous coal.

In comparison, the effect of 5% resid impregnated on the 100-150 mesh size subbituminous coal was not nearly as effective. Thus, in addition to the other drawbacks associated with the use of petroleum derivatives as dust control agents, the present invention provides a clear improvement over the dust prevention attribute of such products. It is believed that when rosin is used as a dust binder, it exists as particles in the interstices of coal, and is not localized on the coal surfaces. Therefore, dust rosin particles can reach coal dust and result in lower dust yield. Furthermore, rosin and tall oil can produce pyrolyzed volatiles which may be effective in capturing flash binding dust.

In general, by treating coal in accordance with the present invention, the surface area of the coal is reduced by agglomerization, coating of coal particles, and plugging of pores found in coal, thereby reducing the potential for spontaneous combustion.

In addition to all of the other advantages achieved with the present invention, it is also believed that by use of the present invention in high moisture containing coal, some of the loosely held moisture can be tied up by the dust-control agents, thus preventing freeze-up of coal in periods of extreme cold.

There have been described what are presently believed to be preferred embodiments of the present invention, but those skilled in the art will realize that changes and modifications may be made thereto without departing from the spirit of the invention, and it is intended to claim all such changes and modifications as fall within the true scope of the invention.

What is claimed is:

1. A method of controlling dust formation and spontaneous combustion in drying, handling, transporting, and storing of low rank coal selected from the group consisting of lignite, peat, and subbituminous coal containing about 20-50% water comprising:

applying to said coal a dust inhibiting amount of an aqueous solution consisting essentially of gelatinized starch at a temperature of from about 60° C. to about 200° C. by spraying said solution over said coal.

2. The method of claim 1 wherein said aqueous starch solution is sprayed by applying elevated pressure of about 500 psi.

3. The method of claim 1 wherein said aqueous starch solution is sprayed at dust control locations selected from the group consisting of the top of a fluidization bed dryer used to dry said low rank coal, at the exits of cyclones used in conjunction with said dryer, at the loading hoppers on the top of coal cars used to transport said low rank coal, and on the top of stock piles of said low rank coal.

4. The method of claim 1 wherein said gelatinization is attained by heating aqueous starch solution to a temperature of from about 60° to 200° C.

5. The method of claim 1, wherein said starch solution is prepared by dry heat treating said starch at a temperature of from about 120° C. to about 200° C. to form pyrodextrins and then dissolving said pyrodextrins in cold water.

6. The method of claim 1 wherein said starch is derived from a source selected from the group consisting of potato, tapioca, corn, waxy corn, wheat, sorghum, rice, barley and cassava, and combinations thereof.

7. The method of claim 6 wherein said source is one of corn, barley, rice and combinations thereof.

8. The method of claim 1 wherein the concentration of said starch is from about 5 to about 50% by weight.

9. The method of claim 1 wherein said starch solution is prepared by dry heat treating said starch in the presence of an acid catalyst at a temperature of from about 90° C. to about 130° C. to form pyrodextrins and then dissolving said pyrodextrins in cold water.

10. The method of claim 9 wherein said acid catalyst is selected from the group consisting of HCl and $HNO_3$.

11. The method of claim 1 wherein said aqueous starch solution is applied at a dosage of from about 0.05 to about 10% of starch to coal.

12. The method of claim 11 wherein said dosage is from about 0.1 to about 2% of starch to coal.

* * * * *